(12) United States Patent
Kang et al.

(10) Patent No.: US 7,813,076 B2
(45) Date of Patent: Oct. 12, 2010

(54) METHOD FOR ESTIMATING POSITION ERROR GAIN FOR HARD DISK DRIVES

(75) Inventors: Chang Ik Kang, Santa Clara, CA (US); Sang Hoon Chu, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 12/203,855

(22) Filed: Sep. 3, 2008

(65) Prior Publication Data

US 2010/0053799 A1  Mar. 4, 2010

(51) Int. Cl.
*G11B 5/596* (2006.01)
(52) U.S. Cl. .............. 360/77.08; 360/77.02; 360/78.04
(58) Field of Classification Search .......... None
See application file for complete search history.

(56) References Cited

U.S. PATENT DOCUMENTS

| | | | | |
|---|---|---|---|---|
| 6,046,879 | A  * | 4/2000 | Hampshire | 360/77.08 |
| 6,515,818 | B1 * | 2/2003 | Harmer | 360/77.08 |
| 7,525,753 | B1 * | 4/2009 | DeRosa | 360/77.02 |
| 2003/0137906 | A1 * | 7/2003 | Tang et al. | 369/44.29 |
| 2005/0219737 | A1 * | 10/2005 | Fukushima et al. | 360/77.08 |

* cited by examiner

*Primary Examiner*—Andrew L Sniezek
(74) *Attorney, Agent, or Firm*—Ben J. Yorks; Irell & Manella LLP

(57) ABSTRACT

A hard disk drive with a controller that determines a position error signal gain. The position error signal gain is determined from a total servo loop gain and a function that is defined by a slope of a line of A and B servo bits measured at N off-track positions. The function determines an actual plant gain and thus provides a more accurate position error signal gain.

10 Claims, 6 Drawing Sheets

US 7,813,076 B2

METHOD FOR ESTIMATING POSITION ERROR GAIN FOR HARD DISK DRIVES

BACKGROUND OF THE INVENTION

1. Field of the Invention

The present invention relates to calculating a position error signal used in hard disk drives.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may also have a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of ((A-B)-(C-D)) to create a position error signal ("PES"). The PES is used to create a drive signal for the voice coil motor to position the head on the track. The system can monitor the PES and inhibit a write operation if the PES value exceeds a certain threshold. The PES is also used to perform seek routines to move the heads from one track to another track.

The PES is typically calculated from the total loop gain of the servo. Unfortunately, the total loop gain does not provide the most accurate PES values, which may lead to undesirable write operations or an improper termination of a write operation.

BRIEF SUMMARY OF THE INVENTION

A hard disk drive with a controller that determines a position error signal gain based on a total servo loop gain and a function defined by a slope of a line of A and B servo bits measured at N off-track positions.

DETAILED DESCRIPTION

Described is a hard disk drive with a controller that determines a position error signal gain. The position error signal gain is determined from a total servo loop gain and a function that is defined by a slope of a line of A and B servo bits measured at N off-track positions. The function determines an actual plant gain and thus provides a more accurate position error signal gain.

Figure 2:
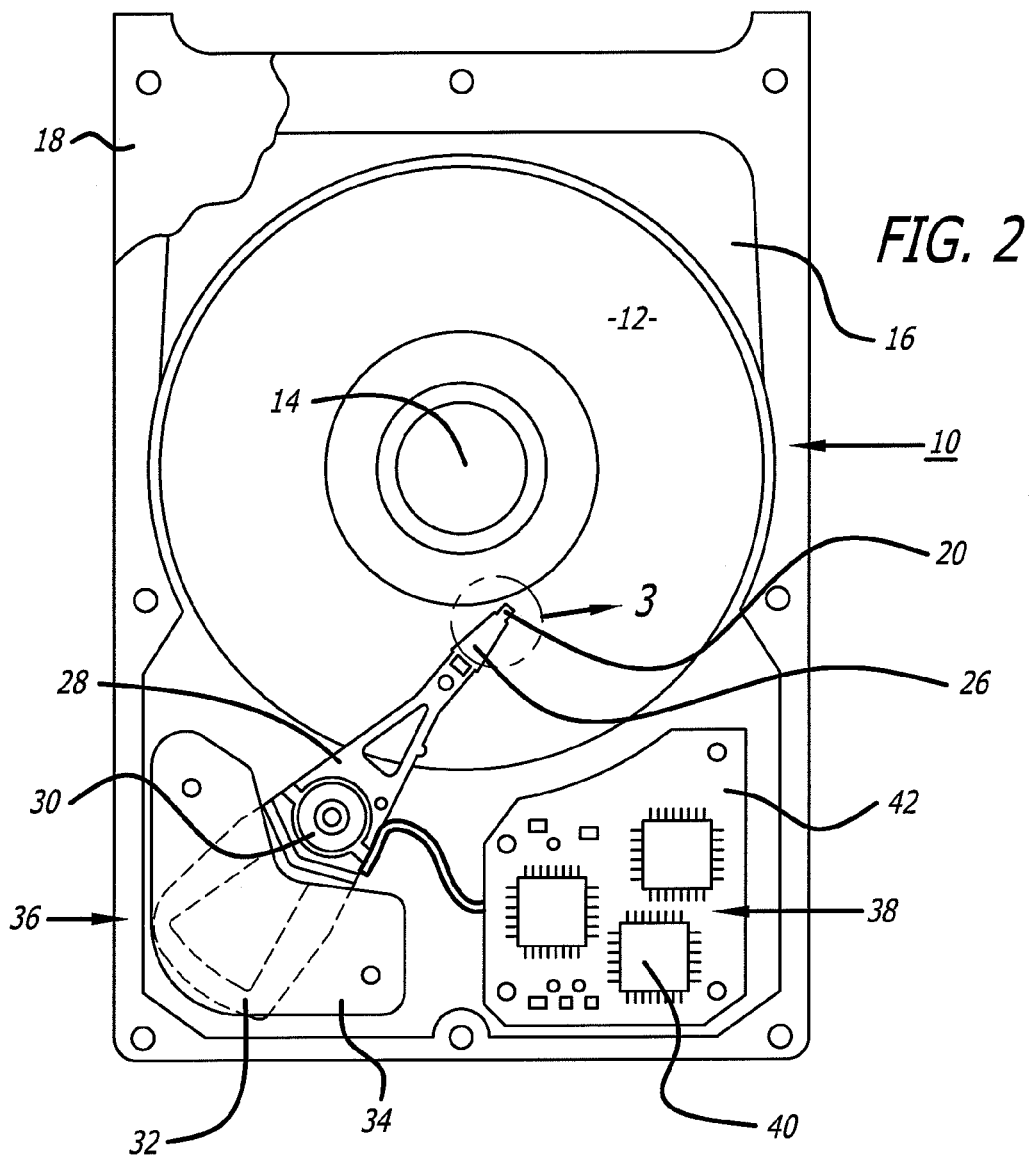
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 3:
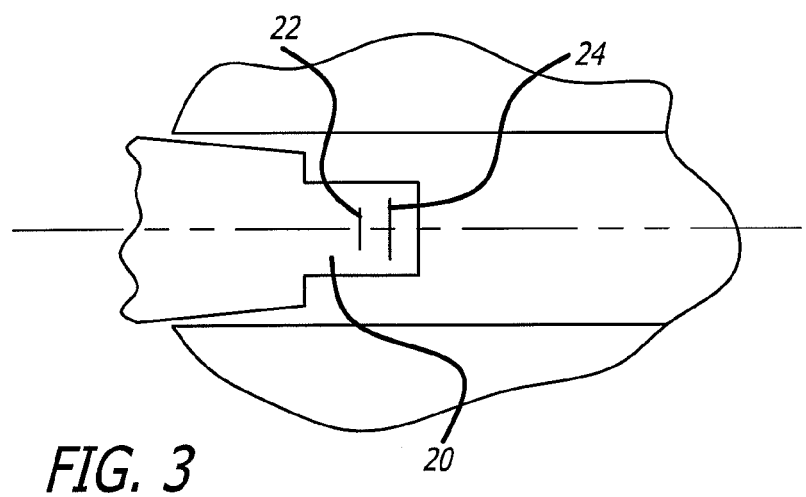
FIG. 3 is a top enlarged view of a head of the hard disk drive.

The disk drive 10 may include a plurality of heads 20 located adjacent to the disks 12. As shown in FIG. 3 the heads 20 may have separate write 24 and read elements 22. The write element 24 magnetizes the disk 12 to write data. The read element 22 senses the magnetic fields of the disks 12 to read data. By way of example, the read element 22 may be constructed from a magneto-resistive material that has a resistance which varies linearly with changes in magnetic flux.

Referring to FIG. 2, each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 4:
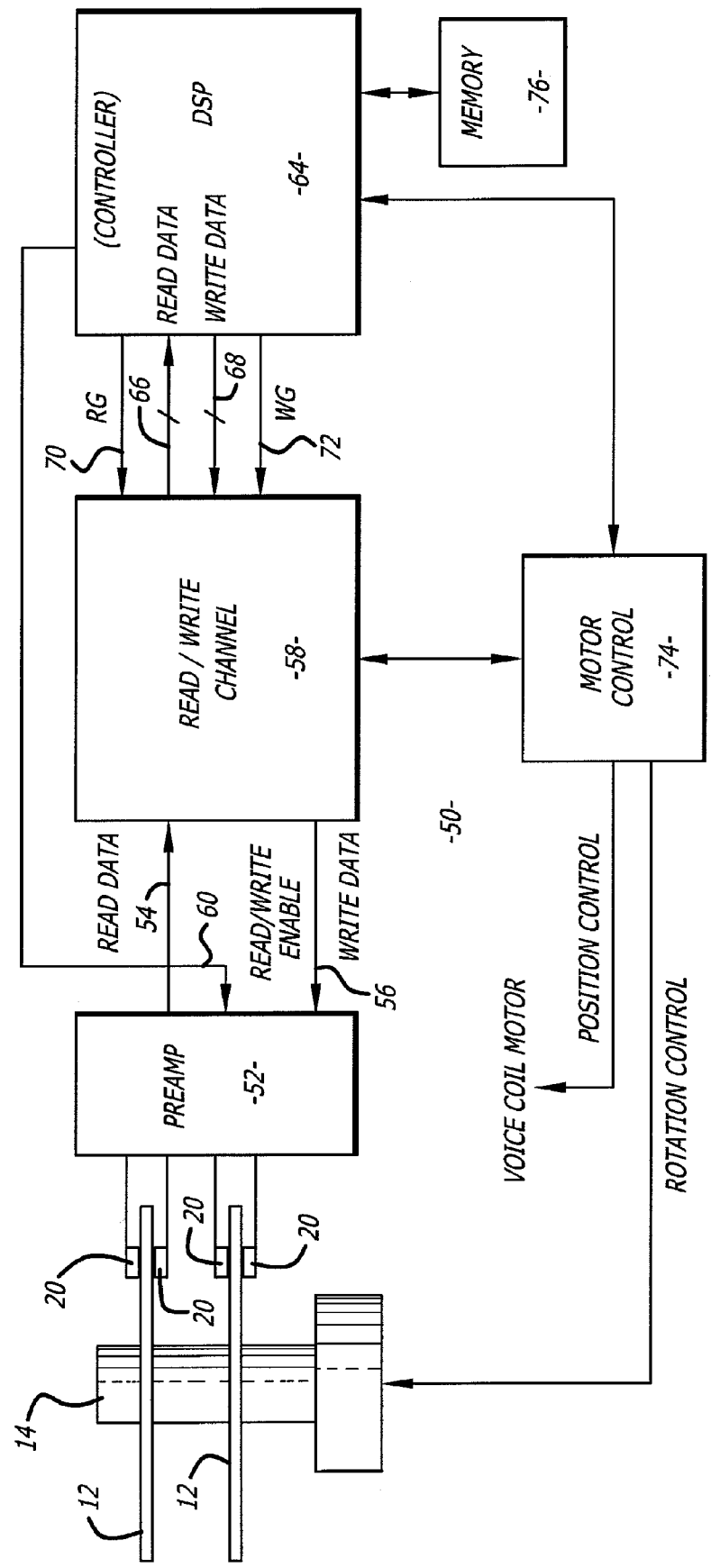
FIG. 4 is a schematic of an electrical circuit for the hard disk drive.

FIG. 4 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14. The controller 64 may be connected to a non-volatile memory device 76. By way of example, the device 76 may be a read only memory ("ROM") that contains instructions that are read by the controller 64.

Figure 1:
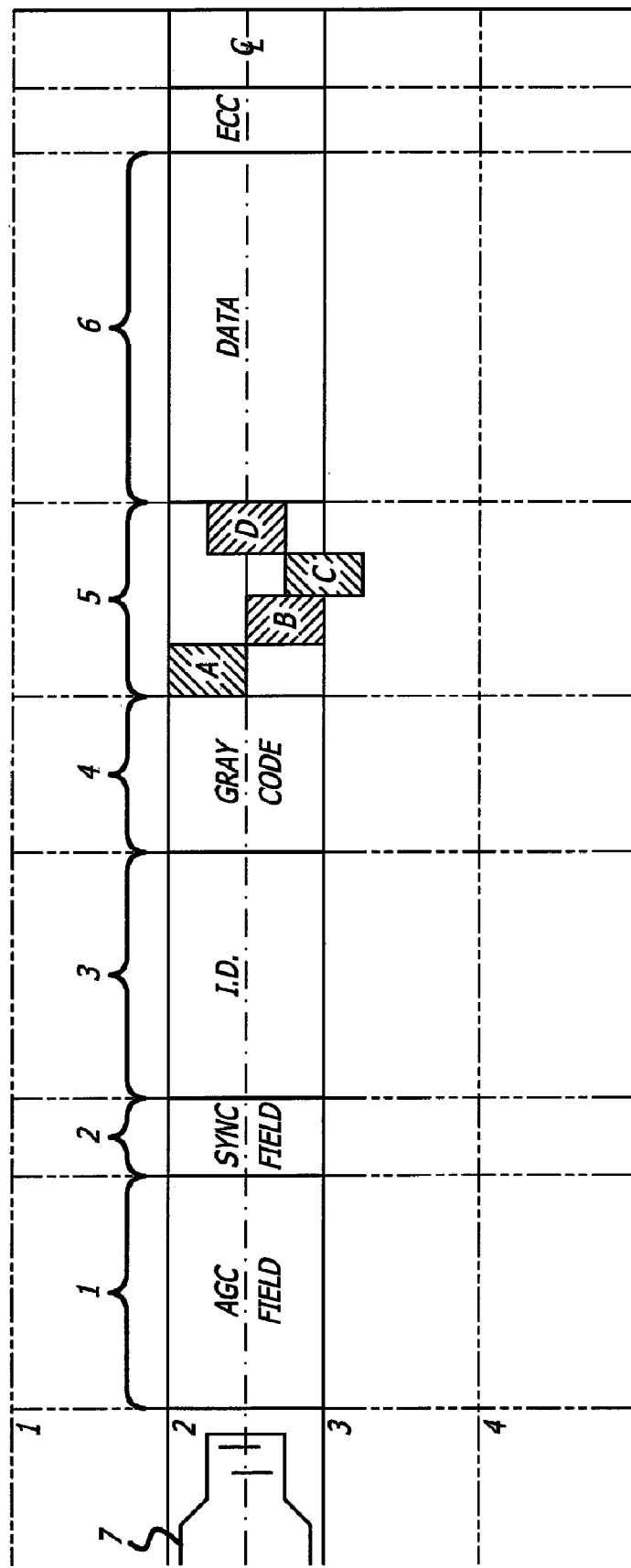
FIG. 1 is an illustration of a track of the prior art.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

Figure 5:
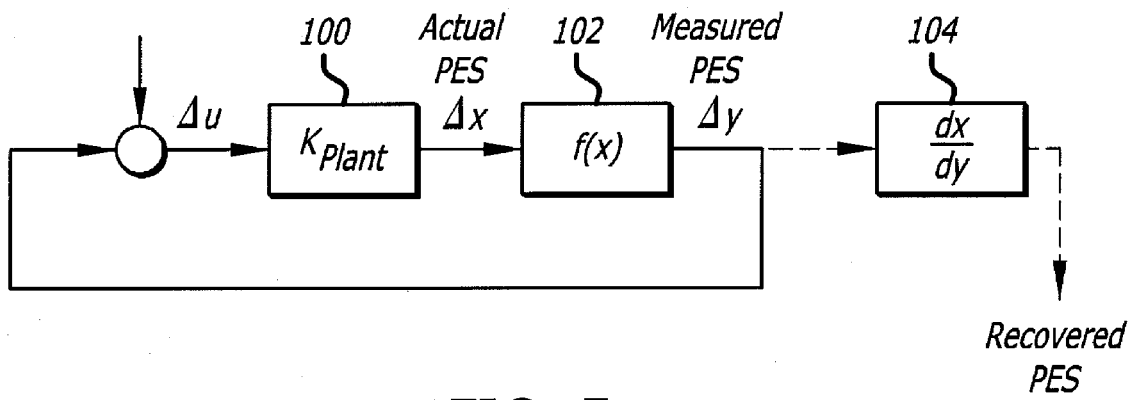
FIG. 5 is a schematic showing function blocks used to determine a position error signal gain.

FIG. 5 shows a schematic of function blocks used to determine a position error signal. The system has a transform $K_{plant}$ 100 that receives an input signal $\Delta u$ and produces an actual PES $\Delta x$. A measured PES $\Delta y$ is transformed by block 102 defined by a function f(x). The actual PES can be recovered by the derivative dx/dy shown in block 104.

If derivatives of the function f(x) are known then the inverse function can be found through integration as shown by the equation below:

$$f^{-1}(y) = \int_0^y \frac{1}{f'(x)} dy = x$$

Assuming a boundary condition of:

$$f^{-1}(Y) = X$$

Then, $$f^{-1}(Y) = \int_0^Y \frac{dx}{dy} dy = K_{plant} \int_0^Y \frac{du}{dy} dy = X$$

Rearranging equation (3) the plant gain is:

$$K_{plant} = \frac{X}{\int_0^Y \frac{du}{dy} dy}$$

Figure 6:
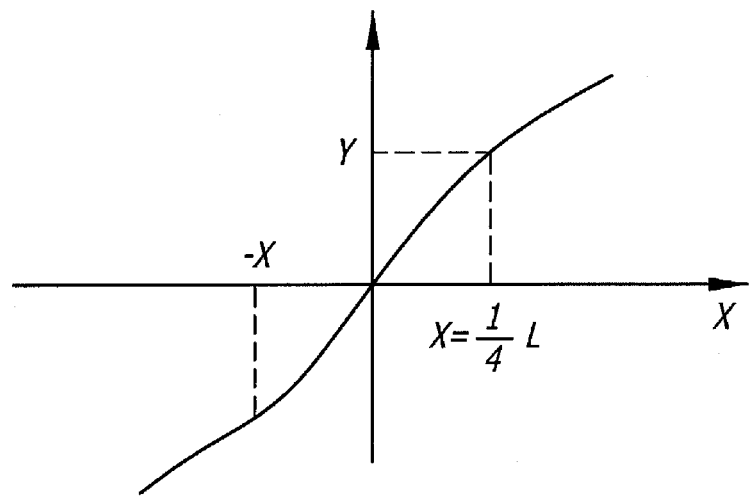
FIG. 6 is a graph showing a line defined by a plurality of A and B servo bit measurements.

The function f(x) is selected to be a profile of the difference between A and B servo bursts measured at N different increments between −X and X. The profile is shown in FIG. 6. By way of example, the increments can be up to one-quarter of a track (e.g., X=¼ L).

Figure 7:
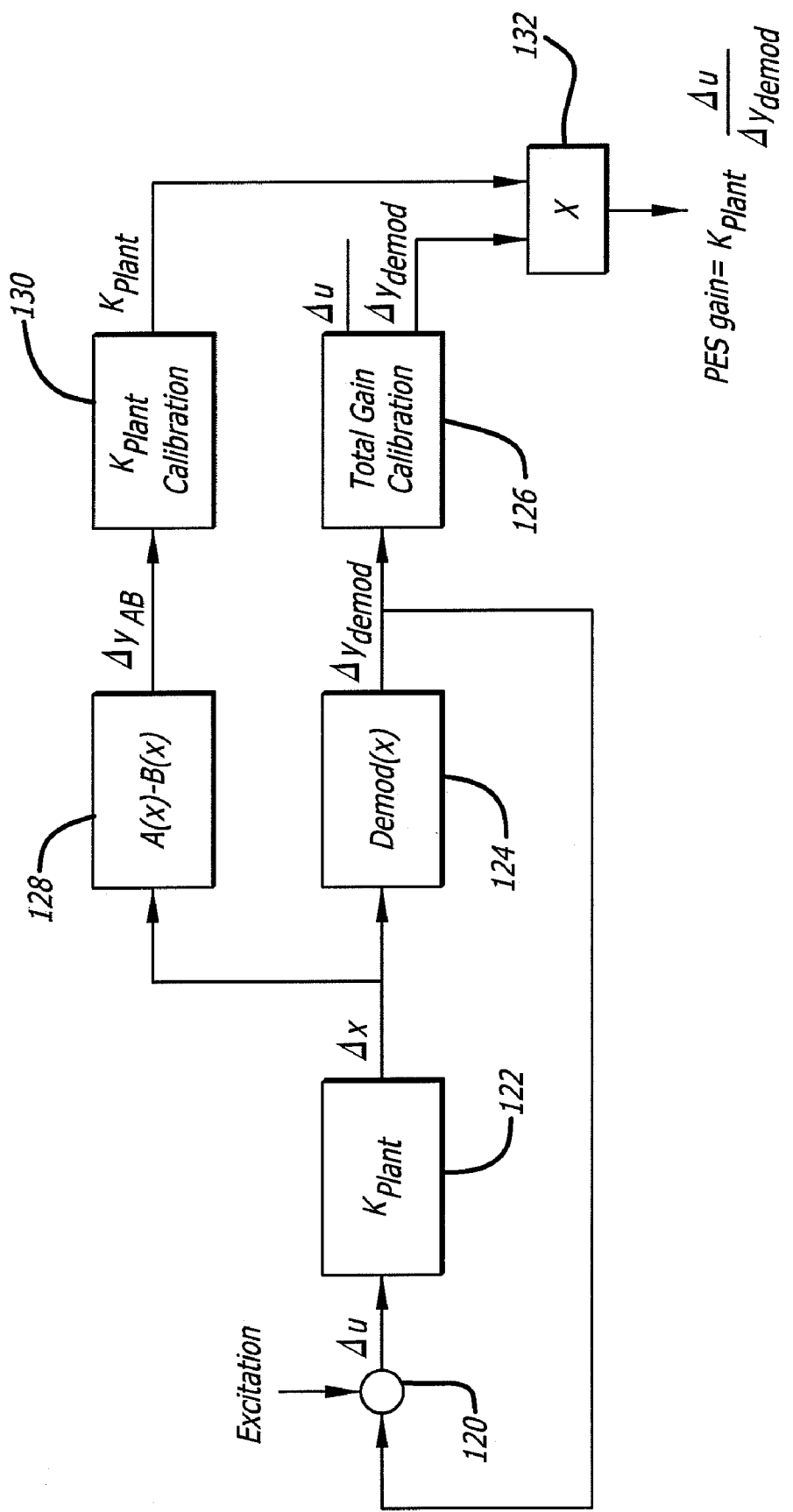
FIG. 7 is a schematic showing function blocks used to determine a position error signal gain.

FIG. 7 shows a schematic of function blocks used to determine a position error signal gain using the A-B servo burst profile shown in FIG. 6. The system is excited through adder 120 to generate an input signal $\Delta u$. The input signal will vary for each off-track position N. Block 122 is the plant transform $K_{plant}$, which produces an actual PES $\Delta x$. Demod(x) block 124 generates $\Delta y_{demod}$ values for each track increment. A total gain calibration block 126 generates total loop gain values $\Delta u/\Delta y_{demod}$ (e.g. $\Delta u/\Delta y_{demod1}$; $\Delta u/\Delta y_{demod2}$; $\Delta u/\Delta y_{demodn}$) at each track increment.

A-B burst values are measured at each off-track position (e.g. $y_{AB,1}$; $y_{AB,2}$; $y_{AB,n}$) Block 128 generates A-B burst profile slopes $\Delta u/\Delta y_{AB,1}$ for each track increment (e.g. $\Delta u/\Delta y_{AB,1}$; ($\Delta u/\Delta y_{AB,2}$; $\Delta u/\Delta y_{AB,n}$). Block 130 calculates a plant gain in accordance with the following equation:

$$K_{plant} = \frac{X}{\sum_{n=1}^{N} \frac{\Delta u}{\Delta y_{AB,n}} (y_{AB,n+1} - y_{AB,n})}$$

Block 132 computes a position error signal gain from the product of blocks 126 and 130 (i.e. $K_{plant}\Delta u/\Delta y_{demod}$). The position error signal gain can be used to center a head on a track. The PES gain can also be used to perform a servo routine.

Figure 8:
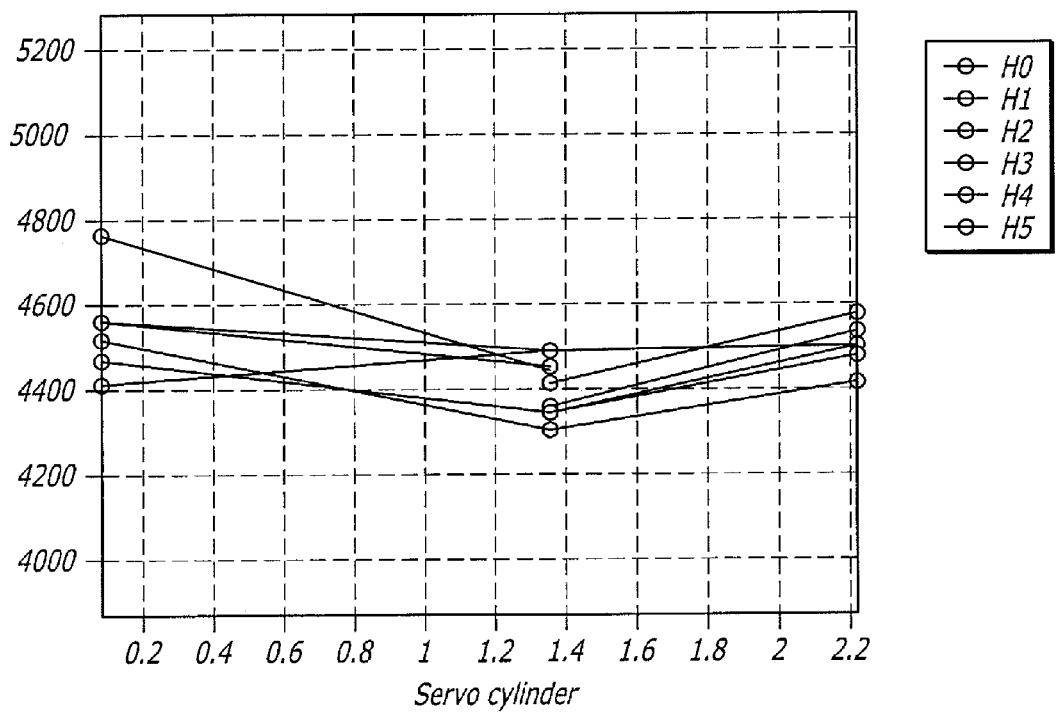
FIG. 8 is a graph showing position error signals as a function of disk location for a servo system of the prior art.
Figure 9:
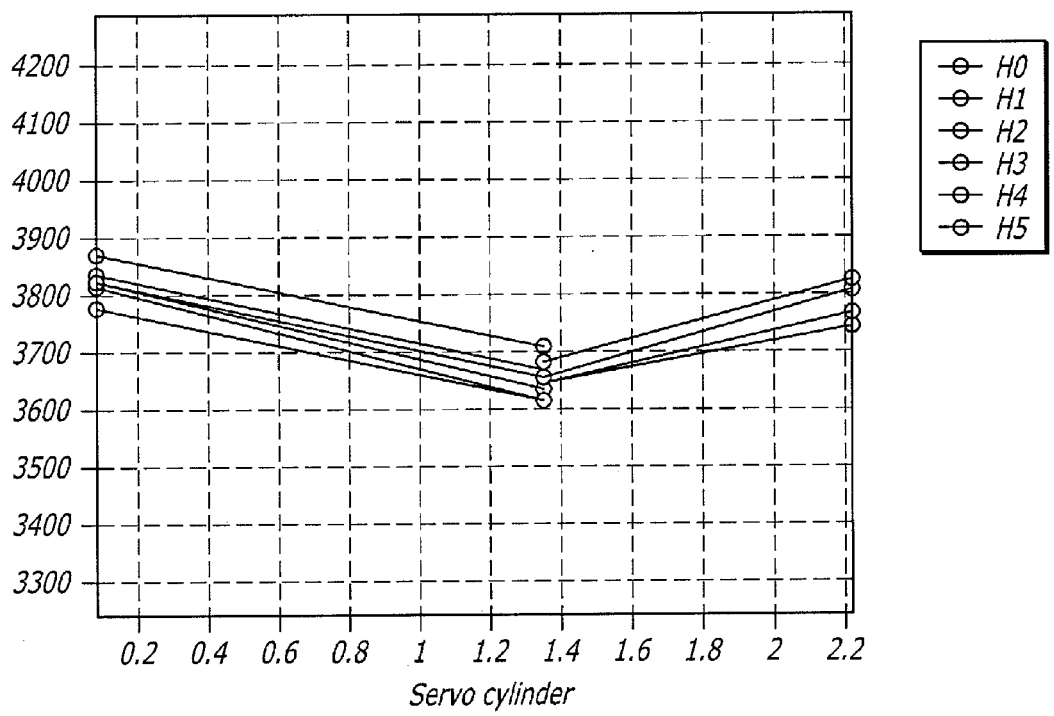
FIG. 9 is a graph showing position error signals as function of disk location for the system described and shown in FIG. 7.

FIGS. 8 and 9 shows PES gain values as a function of disk location for a prior art system, and a system in accordance with FIG. 7, respectively. As can be seen the technique of FIG. 7 produces PES gain values that are more consistent over the surface of the disk.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk that has at least one track, said track having at least one servo sector that has an A servo bit and a B servo bit;
   a head coupled to said disk;
   an actuator arm coupled to said head;
   a voice coil motor actuator coupled to said actuator arm; and,
   a controller that determines a position error signal gain based on a product of a total servo loop gain and a function defined by a slope of a line formed by a difference between said A and B servo bits measured at N off-track positions.

2. The hard disk drive of claim 1, wherein said off-track positions are up to one-quarter of a track.

3. The hard disk drive of claim 1, wherein said position error signal gain is a function of a plant gain defined by the equation:

$$K_{plant} = \frac{X}{\sum_{n=1}^{N} \frac{\Delta u}{\Delta y_{AB,n}} (y_{AB,n+1} - y_{AB,n})}$$

where;

X = the outer limit of said N off-track positions;

$\frac{\Delta u}{\Delta y_{AB,n}}$ = the slope of said function;

$y_{AB,n+1}$ = the difference between the A and B servo burst at each said N off-track position.

4. The hard disk drive of claim 1, wherein said total servo loop gain is measured at said N off-track positions.

5. The hard disk drive of claim 1, wherein said controller centers said head on said track of said disk utilizing said position error signal gain.

6. A method for determining a position error signal gain used in a hard disk drive, comprising:
   determining a total servo loop gain;
   determining a function defined by a slope of a line formed by a difference between A and B servo bits measured at N off-track positions; and,
   determining a position error signal gain from a product of the total servo loop gain and the function.

7. The method of claim 6, wherein the off-track positions are up to one-quarter of a track.

8. The method of claim 6, wherein the position error signal gain is a function of a plant gain defined by the equation:

$$K_{plant} = \frac{X}{\sum_{n=1}^{N} \frac{\Delta u}{\Delta y_{AB,n}}(y_{AB,n+1} - y_{AB,n})}$$

where;

X = the outer limit of said N off-track positions;

$\frac{\Delta u}{\Delta y_{AB,n}}$ = the slope of said function;

$y_{AB,n+1}$ = the difference between the A and B servo burst at each said N off-track position.

9. The method of claim 6, wherein the total servo loop gain is measured at the N off-track positions.

10. The method of claim 6, further comprising centering a head on a disk track utilizing the position error signal gain.

* * * * *